United States Patent
Pollman et al.

(10) Patent No.: US 6,533,695 B2
(45) Date of Patent: Mar. 18, 2003

(54) HYDROMECHANICAL TRANSMISSION

(75) Inventors: Frederic W. Pollman, Eden Prairie, MN (US); Steven H. Gluck, Cambridge, IA (US); Lyle R. Bretz, Ames, IA (US); Thomas D. Pierce, Hyogo-ken (JP); John D. Moline, Ellsworth, IA (US); Bradly Roetman, Eudora, KS (US); Michael Todd, Sullivan, IL (US)

(73) Assignee: Sauer-Danfoss, Inc., Ames, IA (US)

( * ) Notice: Subject to any disclaimer, the term of this patent is extended or adjusted under 35 U.S.C. 154(b) by 0 days.

(21) Appl. No.: 10/055,494

(22) Filed: Oct. 29, 2001

(65) Prior Publication Data

US 2002/0119856 A1 Aug. 29, 2002

Related U.S. Application Data

(60) Provisional application No. 60/244,229, filed on Oct. 30, 2000.

(51) Int. Cl.[7] ............................................. F16H 47/04
(52) U.S. Cl. ............................................. 475/72; 475/74
(58) Field of Search ........................ 475/72, 74, 82, 475/83

(56) References Cited

U.S. PATENT DOCUMENTS

| | | | | |
|---|---|---|---|---|
| 2,296,929 A | * | 9/1942 | Ifield ........................... | 475/72 |
| 4,373,408 A | * | 2/1983 | Mills ........................... | 475/72 |
| 4,976,666 A | * | 12/1990 | Meyerle ....................... | 475/83 |
| 5,807,199 A | * | 9/1998 | Keller .......................... | 475/72 |
| 5,967,927 A | * | 10/1999 | Imamura et al. .............. | 475/83 |

FOREIGN PATENT DOCUMENTS

| JP | 11-2307 A | * | 1/1999 |
|---|---|---|---|
| JP | 2000-179648 A | * | 6/2000 |

* cited by examiner

Primary Examiner—Ankur Parekh

(57) ABSTRACT

A hydromechanical transmission includes a hydrostatic transmission with coaxially arranged fixed and variable displacement hydrostatic units connected to a planetary gear set. The input shaft of the variable unit extends coaxially through the hollow shaft member of the fixed unit to drive the ring gear of the planetary gear set. The hollow shaft member drives the sun gear of the planetary gear set. An input clutch can be provided to allow the hydromechanical transmission to achieve zero output speed. A charge pump driven by the input shaft of the variable unit can be utilized to insure that the hydraulic units are primed whenever the input shaft turns. The input torque can be applied from either end of the variable unit. A power takeoff shaft option is available from the end of the transmission opposite the input.

13 Claims, 5 Drawing Sheets

HYDROMECHANICAL TRANSMISSION

CROSS REFERENCE TO RELATED APPLICATION

This application is based upon Applicant's U.S. Provisional Patent Application Serial No. 60/244,229 filed Oct. 30, 2000.

BACKGROUND OF THE INVENTION

The present invention relates to the field of propulsion systems for vehicles. More particularly, this invention relates to a hybrid hydromechanical vehicle transmission that includes both a hydrostatic transmission and a planetary gear set.

Hydromechanical transmissions in general are discussed in U.S. Pat. Nos. 4,341,131 and 4,306,467. The complete disclosure of those patents is incorporated by reference herein. Low power transmissions are needed for various vehicles including but not limited to two-wheel and four-wheel all terrain vehicles (ATVs), farm tractors, lawn and garden vehicles, and utility vehicles. Conventional low power transmissions for such uses utilize variable belts. Unfortunately, variable belts often have very limited lives when exposed to the elements and can slip when wet. Thus, there is a need for a compact, low cost, continuously variable transmission that overcomes the limitations of the current, competitive variable belt technology.

Therefore, a primary objective of the present invention is the provision of an improved hydromechanical transmission.

Another objective of this invention is the provision of a hydromechanical transmission that is an improvement over variable belt driven transmissions.

Another objective of this invention is the provision of a hydromechanical transmission that does not require service access to a belt and therefore can be sealed in an oil tight compartment to protect it from external water immersion.

Another objective of this invention is a hydromechanical transmission design that can be easily tailored to different variable ratio range requirements for different vehicles.

A further objective of this invention is the provision of a hydromechanical transmission that has a space efficient layout and a simple, cost-effective gear design.

These and other objectives will be apparent to one skilled in the art from the drawings, as well as from the description and claims that follow.

SUMMARY OF INVENTION

This invention relates to a hybrid hydromechanical vehicle transmission that includes both a hydrostatic transmission and a planetary gear set. This transmission is designed to be a very compact integrated continuously variable transmission package. The hydromechanical transmission of this invention can be used as a complete transmission, or more probably, as a portion of a complete transmission package. In the latter case, a range gearbox could be added after this variable transmission to cover a wider range of torques and speeds.

The hydromechanical transmission includes a hydrostatic transmission connected to a planetary gear set. The hydrostatic transmission includes a variable displacement unit connected in a closed loop circuit to a fixed displacement unit. The planetary gear set includes a ring gear rotatably mounted in a housing, a carrier plate assembly with output shafts protruding therefrom, a plurality of planet gears rotatably mounted on the carrier plate assembly engaging the ring gear and a sun gear.

The gears of the planetary gear set can be removed and replaced with gears having a different number of teeth so as to change the overall ratio of the hydromechanical transmission without changing the power rating of the hydrostatic transmission or the size of the housing.

This set of components is capable of providing a continuously variable ratio between the input and output speeds and torques. As the variable hydrostatic unit strokes from maximum negative displacement to maximum positive displacement the transmission ratio will vary continuously from a deep reduction to nearly no reduction (1:1 ratio).

All the components are arranged along a common shaft centerline, i.e.—coaxially. The relative connections to the planetary elements (ring, sun, carrier) shown here are optimized to achieve a compact package and a single centerline. This coaxial design minimizes the relative speeds between components. At the maximum output speed all components are rotating at the same speed.

It is possible to use many different planetary ratios to tailor the transmission ratio spread and speeds. Also, the absolute and relative displacements of the hydrostatic kits can be changed to optimize the transmission to the application.

DETAILED DESCRIPTION OF THE PREFERRED EMBODIMENT(S)

The hydromechanical transmission (hereinafter HMT) 10 of this invention includes a hydrostatic transmission 12 connected to a planetary gear set 14. The hydrostatic transmission 12, also referred to herein as a HST, includes a variable displacement hydraulic unit V fluidly connected in a closed loop circuit by conduits 16, 18 to a fixed displacement hydrostatic unit F. Preferably hydrostatic unit F is a fixed displacement unit sometimes referred to as a motor.

Figure 1:
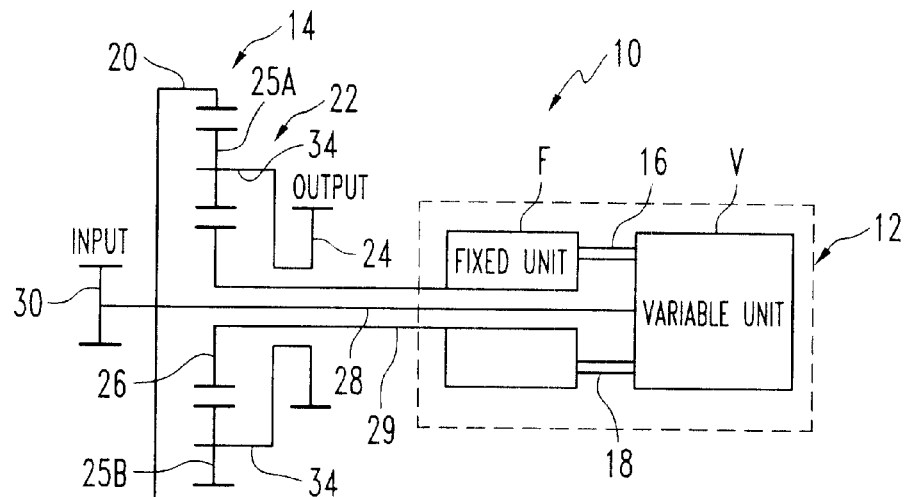
FIG. 1 is a schematic diagram illustrating on embodiment of the hydromechanical transmission of this invention.

A single mode planetary gear set 14 is believed to be well known in the mechanical arts and is therefore only summarily described herein. As best seen in FIG. 1, the planetary gear set 14 has a ring gear 20 rotatably mounted in a housing (not shown) and a carrier plate assembly 22 rotatably mounted within the ring gear 20.

Figure 4:
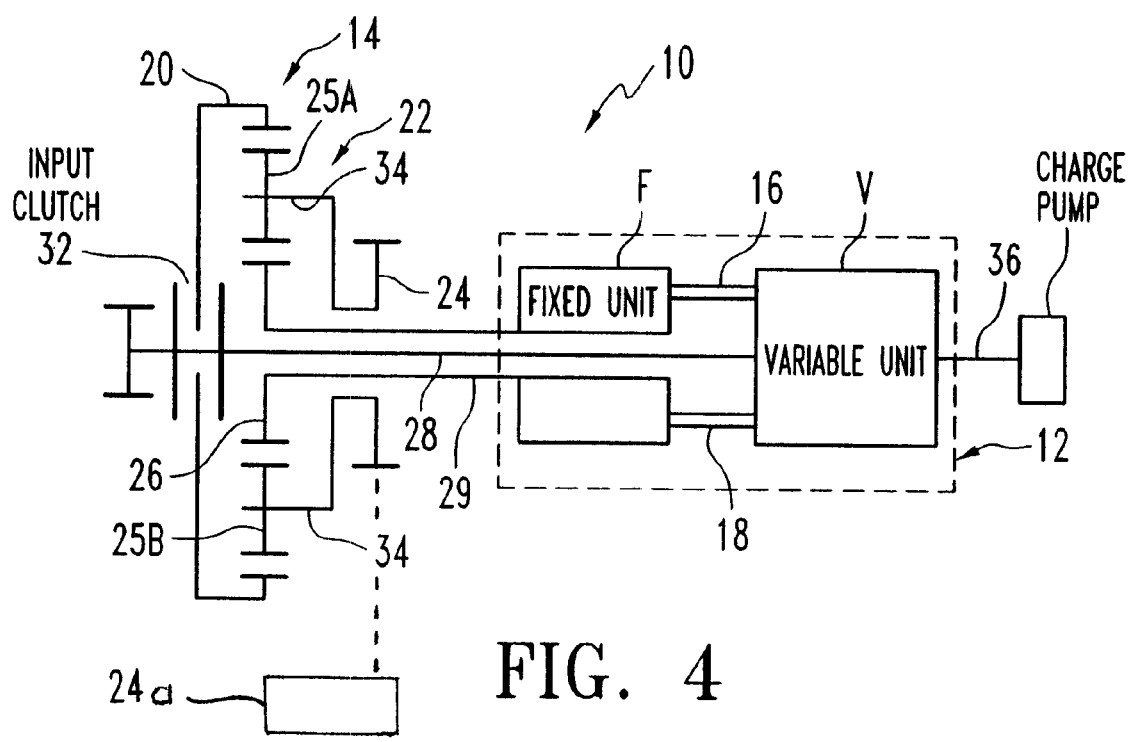
FIG. 4 is a view similar to that of FIG. 3 but shows an alternate location of the charge pump.

A plurality of radially and angularly spaced pins 34 extend from one of the outwardly directed opposing surfaces. Each of the pins 34 is generally parallel to the axis of rotation for the sun gear 26 and the ring gear 20. A plurality of planetary gears 25A, 25B, 25C, etc. (collectively referred to hereinafter as P) rotatably mount on the pins 34. As is conventional, the planetary gears 25A, 25B, 25C are generally cylindrical and have an outer diameter with a plurality of gear teeth thereon. Together the gears 25A, 25B, 25C engage and support a sun gear 26 between them. The sun gear 26 is mounted for rotation with the hollow shaft member 29. As is known in the art of planetary gear sets, the carrier plate assembly 22 has voids and clearance holes where needed to accommodate the gears 25A, 25B, 25C and to reduce the weight of the assembly. The carrier plate assembly 22 has an output member or shaft 24 protruding therefrom. A range gearbox 24a may be connected to and driven by the output member 24 as shown in FIG. 4.

An axial piston hydrostatic fixed displacement unit F is preferred because its rotating assembly or kit facilitates connecting the variable unit input shaft 28 through the center of the kit. The fixed unit F has a rotating assembly with an axial opening therethrough defined by a hollow shaft member 29. A variable displacement axial piston unit or kit would also work within the scope of this invention, but the design would be more complex and less compact. Note that the mechanical input can be made to either end of the hydrostatic transmission. The preferred input location is at the planetary end. This location will minimize the power transmitted through the long (inner) input shaft 28 connecting the ring gear 20 and the variable unit V, resulting in a smaller and lower cost shaft.

Figure 2:
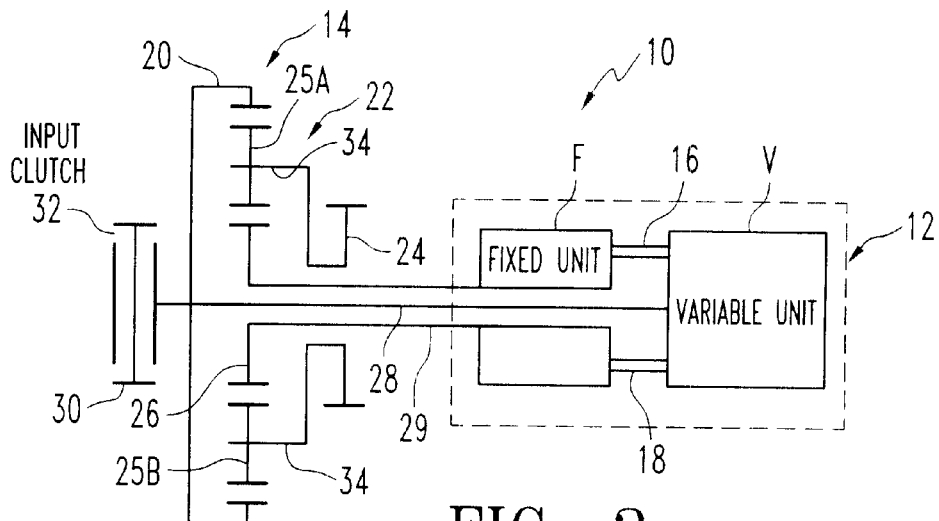
FIG. 2 is a schematic diagram illustrating a second embodiment of the hydromechanical transmission of this invention.
Figure 3:
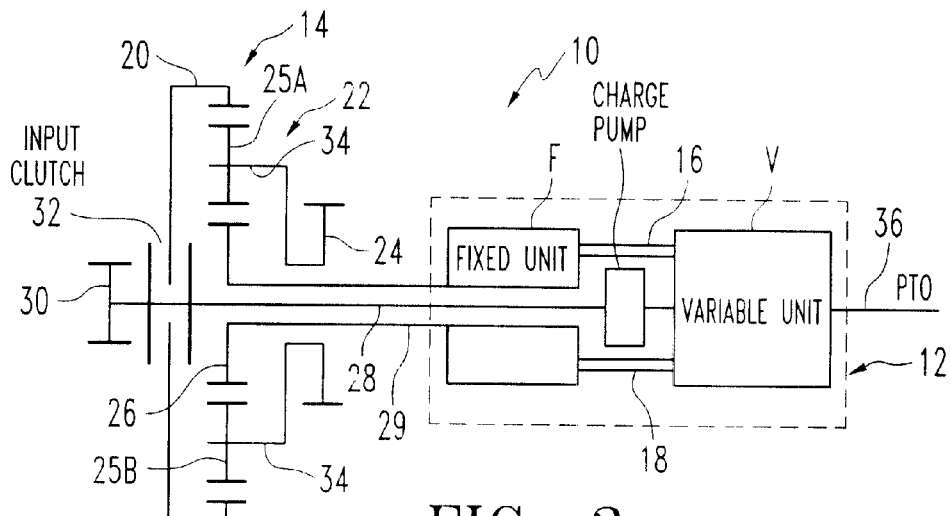
FIG. 3 is a schematic diagram illustrating a third embodiment of the hydromechanical transmission of this invention.
Figure 1B:
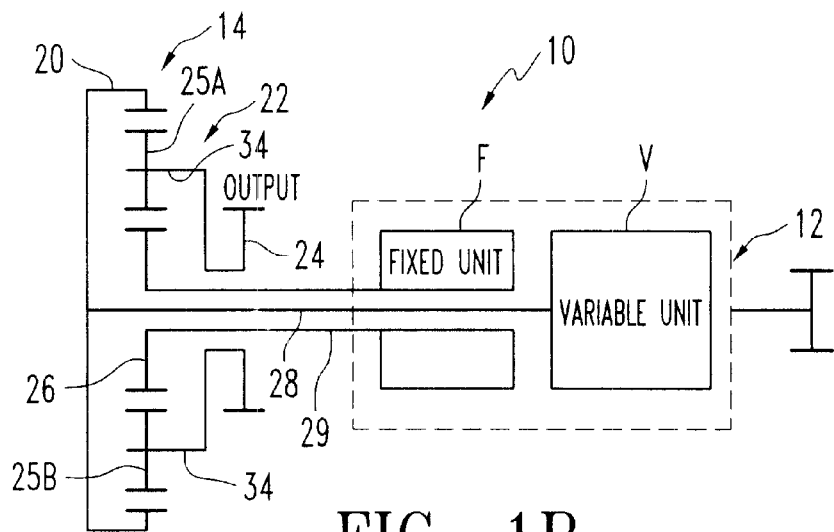
FIGS. 1b, 2b and 3b are views similar to FIGS. 1–3, respectively, but show alternate locations of the input units.
Figure 2B:
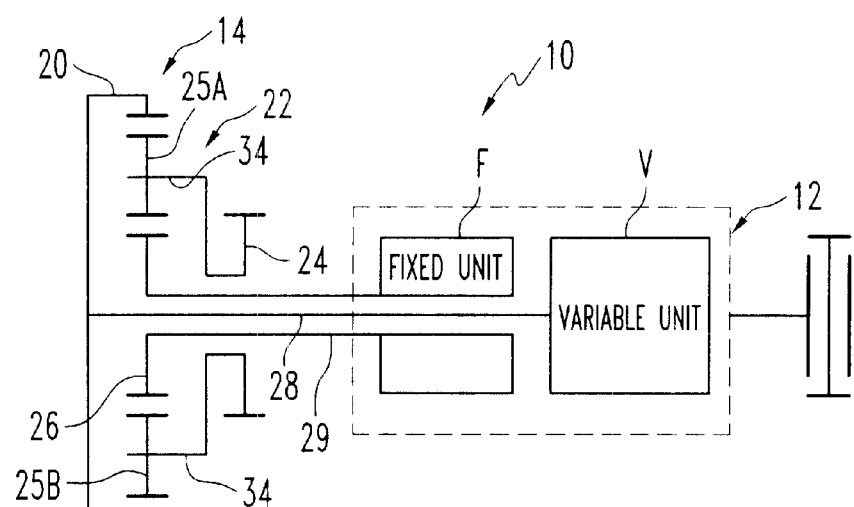
Figure 3B:
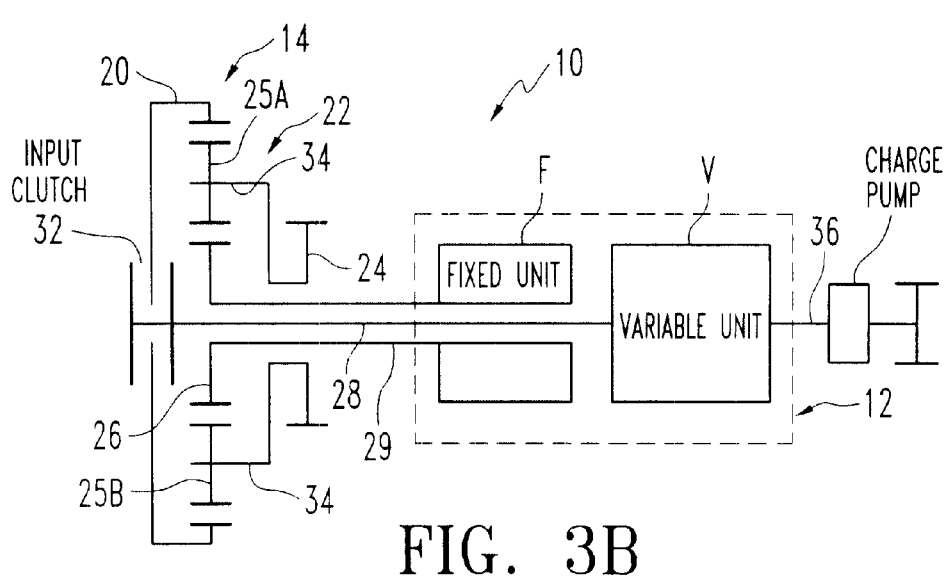
Figure 1C:
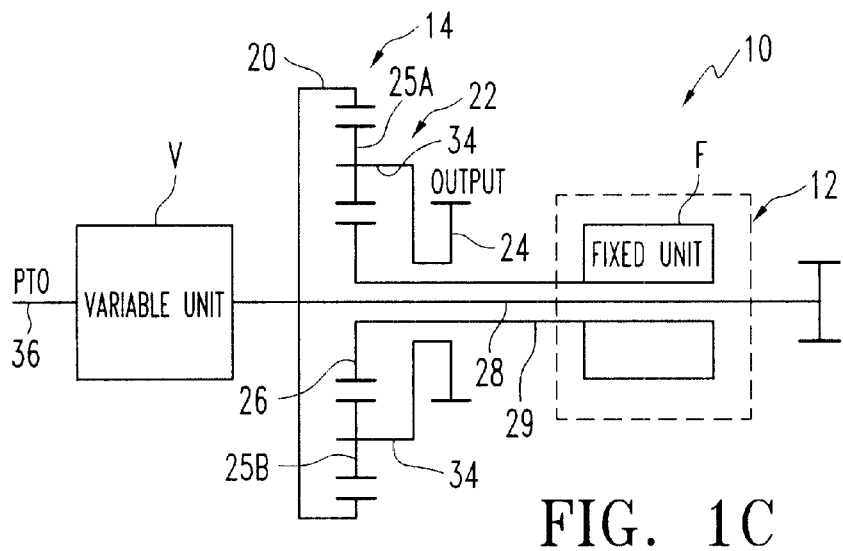
FIGS. 1c, 2c and 3c are views similar to FIGS. 1–3, respectively, but show alternate locations of the input/PTO units.
Figure 2C:
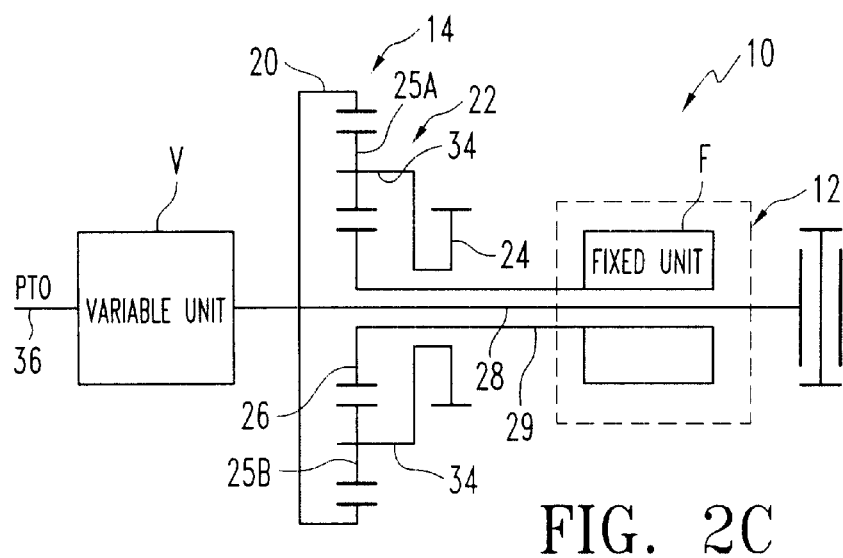
Figure 3C:
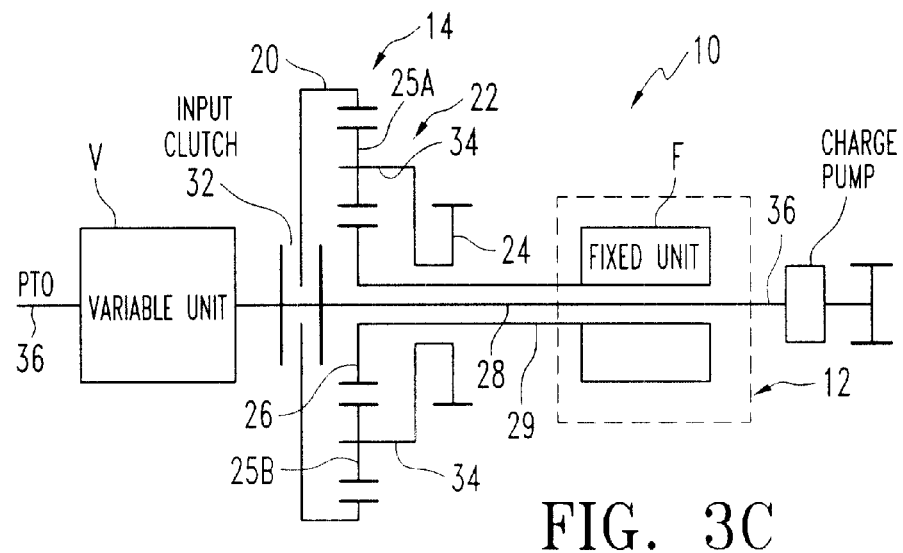
Figure 1D:
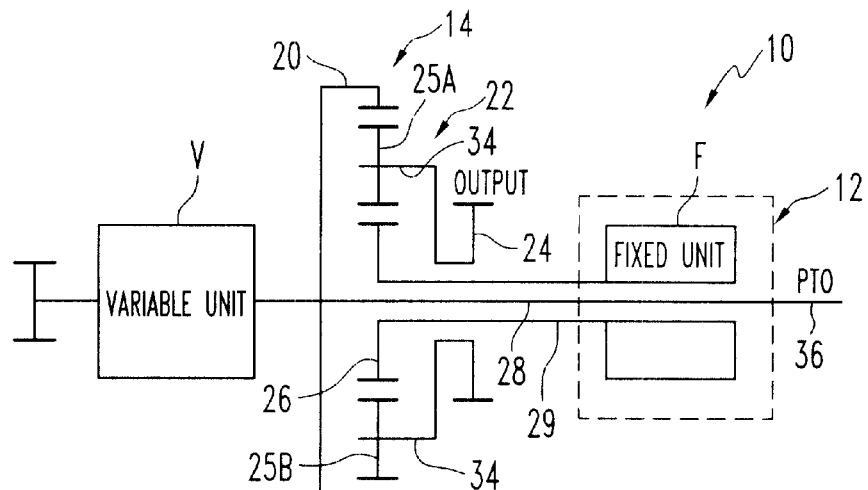
FIGS. 1d, 2d and 3d are views similar to FIGS. 1–3, respectively, but show alternate locations of the variable units.
Figure 2D:
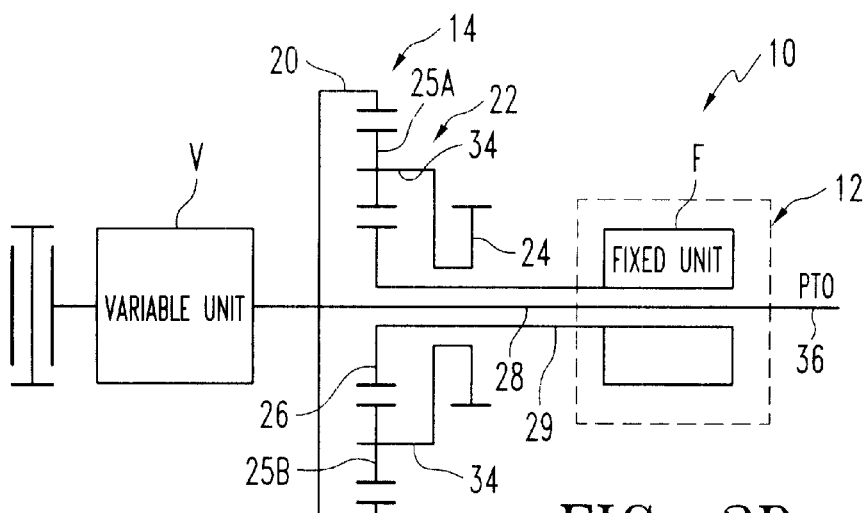
Figure 3D:
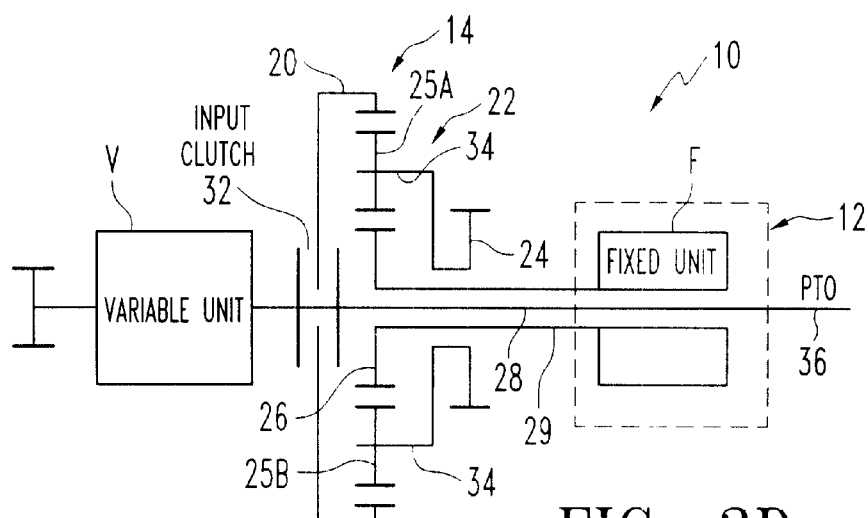

The mechanical input shown in FIGS. 1–3 is a small gear 30 connected to one end of the ring gear 20. An alternative input connection could be through an external gear mounted (or machined into) on the outside diameter of the ring gear 20. Other mechanical drive connections such as chains or belts could be used also.

The transmission as initially conceived and shown in FIG. 1 cannot reach zero output speed so long as the rotational power source (not shown) or mechanical input is turning. However, if required, zero speed can be achieved by multiple methods. First, the planetary gear ratios could be modified so that zero output speed is achieved when the fixed unit is at, or near, its maximum negative speed. However, configuring this transmission for a speed range from maximum to zero output speed would require larger hydrostatic units and precise control of the variable hydrostatic unit displacement: both adding significant cost. Second, a clutch 32 can be added before the mechanical input. When the clutch 32 is disengaged all elements of the HMT 10 will stop. Use of a centrifugal clutch is preferred in this location. FIG. 2 illustrates this first approach.

Third, a unique startup arrangement could be achieved by connecting the input centrifugal clutch 32 to the ring gear 20 only. The variable unit V will remain connected to the prime mover or source of rotational power at all times. The advantage of this second approach is that the hydrostatic units V,F remain live, even when the input clutch 32 is disconnected and the output stopped. This will enhance the durability of the hydrostatic components V and provide a smoother startup because the hydrostatic units remain charged (primed) and ready to transmit torque. FIG. 3 illustrates the second approach. The approach of FIG. 3 could also facilitate the inclusion of a power takeoff (PTO) shaft 36 at the variable unit V function since input power can be transmitted through the center shaft 28 at all times. A hydraulic oil source is needed to provide charge oil for the hydrostatic units in this transmission. If the variable unit input shaft 28 remains live, the charge pump 34 could be located and driven off this shaft, eliminating the need to remotely mount it.

FIG. 1 shows the power path in general. The engine or source of rotational power rotates the input shaft of the variable unit V and the attached ring gear 20. The ring gear 20 then rotates at a speed that is proportional to the engine speed. Meanwhile, the hydrostatic transmission 12 is also driven by the engine and the hollow shaft member 29 of the unit F rotates the sun gear 38 at a given speed that depends on the commanded displacement of the variable unit V. The sun gear 26 drives the planet gears 25A, 25B, 25C. Because the planet gears 25A, 25B, 25C are meshed with sun gears 26, as is the ring gear 20, the carrier plate assembly 22 is continuously driven at a speed that is dependent on the displacement of the variable unit V. Thus, the carrier plate assembly 22 and the output shaft member 24 attached thereto rotate at a speed that is a function of both the input speed and displacement ratio of the hydrostatic transmission 12.

At low output speeds, the fixed unit F actually functions as a pump and the variable unit V acts as a motor. Thus, the hydrostatic (HST) power dips into the negative. At higher output speeds, the fixed unit F passes through a zero displacement position (neutral) and reverses direction such that the HST power becomes positive again. Greater overall speed is attainable by the hydromechanical transmission 10, without consuming as much HST power.

Of course, the invention is not limited to particular input power values, output torque, output speed, or gear ratios, but the example described above illustrates a combination possible with the invention.

The advantages of the invention are many, including:
1) axial or coaxial location of the components of the hydromechanical transmission for compactness;
2) arrangement of the input shaft 28 so as to connect and pass concentrically through the center of a hydrostatic kit;
3) mechanical input to the ring gear 20 to minimize the power transmitted through the variable unit drive shaft 28;
4) provision of a modular HMT concept with flexibility of input connection;
5) clutching only the ring gear mechanical input, while keeping the variable unit live, to achieve zero speed startup condition; and
6) an axial HMT package where all components rotate at the same speed at one end of the ratio range.

Thus, it can be seen that the present invention at least accomplishes its stated objectives.

In the drawings and specification, there have been set forth preferred embodiments and examples relating to the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A variable ratio hydromechanical transmission for propelling a vehicle comprising:
   a hydrostatic transmission including a fixed displacement hydrostatic unit and a variable displacement hydrostatic unit fluidly connected to the fixed displacement hydrostatic unit in a closed loop circuit by a pair of conduits;

the fixed displacement hydrostatic unit including a rotating assembly therein having an axial opening therethrough defined by a hollow shaft member;

a planetary gear set including a rotatable ring gear, a carrier plate assembly rotatable within the ring gear and having an output member thereon, a sun gear coupled for rotation with the hollow shaft member, and a plurality of planetary gears rotatably mounted on the carrier plate assembly and simultaneously mating with the sun gear and the ring gear so as to drive the output member;

the variable displacement hydrostatic unit including an input shaft drivingly connected to the ring gear and adapted to be connected to a source of rotational power;

the fixed displacement hydrostatic unit being located between the variable displacement hydrostatic unit and the planetary gear set; and the input shaft extending coaxially through the hollow shaft member of the fixed displacement hydrostatic unit.

2. The hydromechanical transmission of claim 1 wherein the ring gear, the carrier plate assembly, the sun gear and the output member are all located coaxially with respect to the input shaft.

3. The hydromechanical transmission of claim 1 comprising a range gearbox connected to and driven by the output gear of the planetary gear set.

4. The hydromechanical transmission of claim 1 comprising an input clutch operatively located between the source of rotational power and both the ring gear and the input shaft of the variable displacement hydrostatic unit.

5. The hydromechanical transmission of claim 4 wherein the input clutch is a centrifugal clutch.

6. The hydromechanical transmission of claim 1 comprising an input gear mounted for rotation with the input shaft and adapted for connection with the source of rotational power.

7. The hydromechanical transmission of claim 6 wherein the ring gear has an outer diameter, an inner diameter with gear teeth thereon, and opposing axial ends; the input gear being connected to one of the ends of the ring gear.

8. The hydromechanical transmission of claim 7 wherein the input gear is attached to the outer diameter of the ring gear.

9. The hydromechanical transmission of claim 1 wherein the input shaft of variable displacement hydrostatic unit protrudes from the variable displacement hydrostatic unit only in a single direction toward the planetary gear set.

10. The hydromechanical transmission of claim 1 wherein the fixed displacement hydrostatic unit is an axial piston hydraulic motor.

11. The hydromechanical transmission of claim 1 wherein the planetary gear set is a single stage planetary gear set.

12. The hydromechanical transmission of claim 1 comprising a charge pump for replenishing fluid losses in the closed circuit loop, the charge pump being driven by the input shaft of the variable displacement hydrostatic unit.

13. The hydromechanical transmission of claim 12 comprising a power takeoff shaft coupled with the input shaft at the variable displacement hydrostatic unit.

* * * * *